Oct. 8, 1935.   E. A. CORBIN, JR   2,016,359
BRAKE
Filed April 6, 1933   6 Sheets-Sheet 1

INVENTOR
*Elbert A. Corbin, Jr.*,
BY *Louis Necho*
ATTORNEY

Oct. 8, 1935.  E. A. CORBIN, JR  2,016,359
BRAKE
Filed April 6, 1933   6 Sheets-Sheet 2
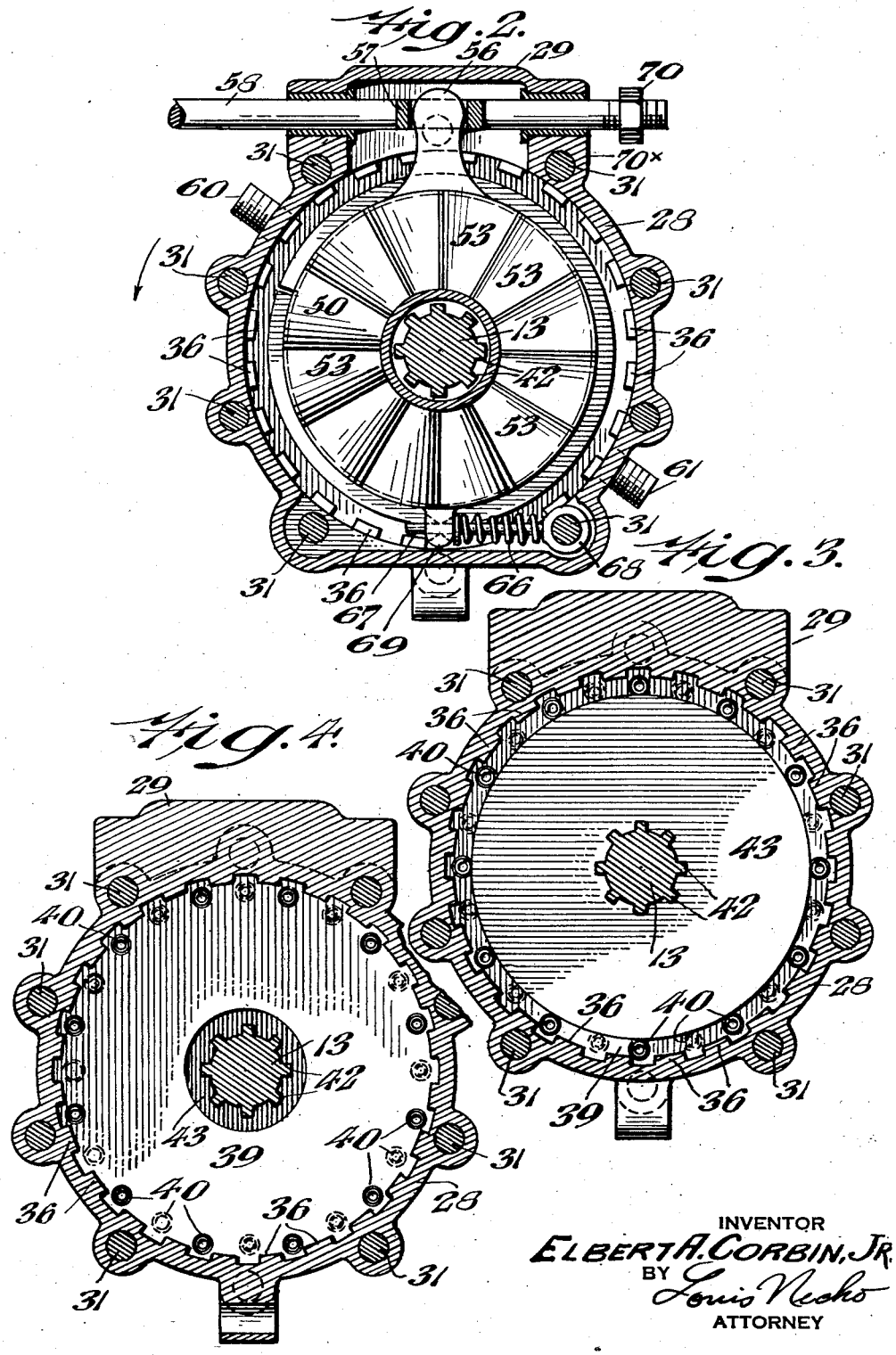
INVENTOR
Elbert A. Corbin, Jr.
BY
Louis Necho
ATTORNEY Oct. 8, 1935.  E. A. CORBIN, JR  2,016,359
BRAKE
Filed April 6, 1933  6 Sheets-Sheet 3

INVENTOR
Elbert A. Corbin, Jr.
BY Louis Necho
ATTORNEY

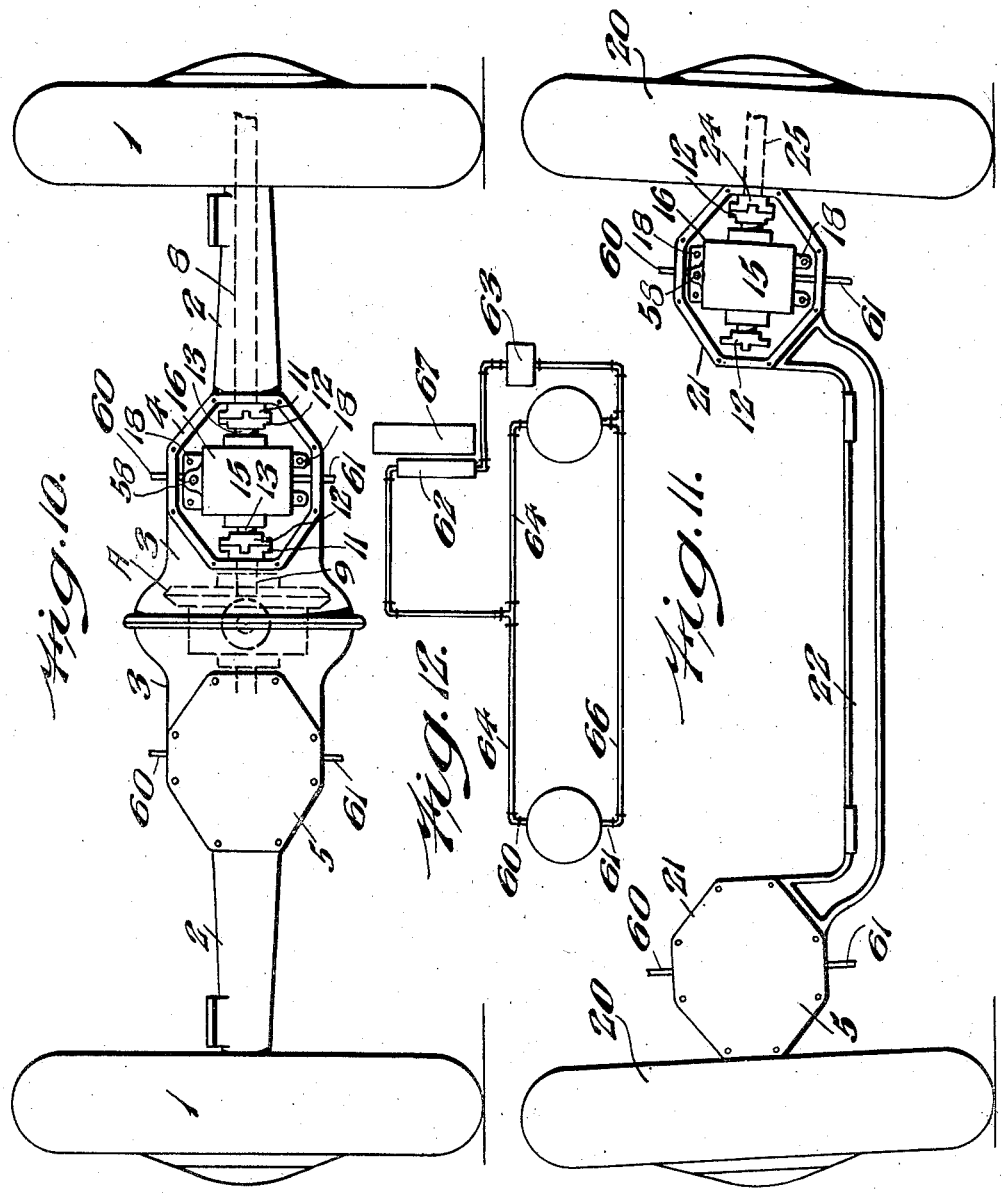

Oct. 8, 1935.  E. A. CORBIN, JR  2,016,359
BRAKE
Filed April 6, 1933   6 Sheets-Sheet 5
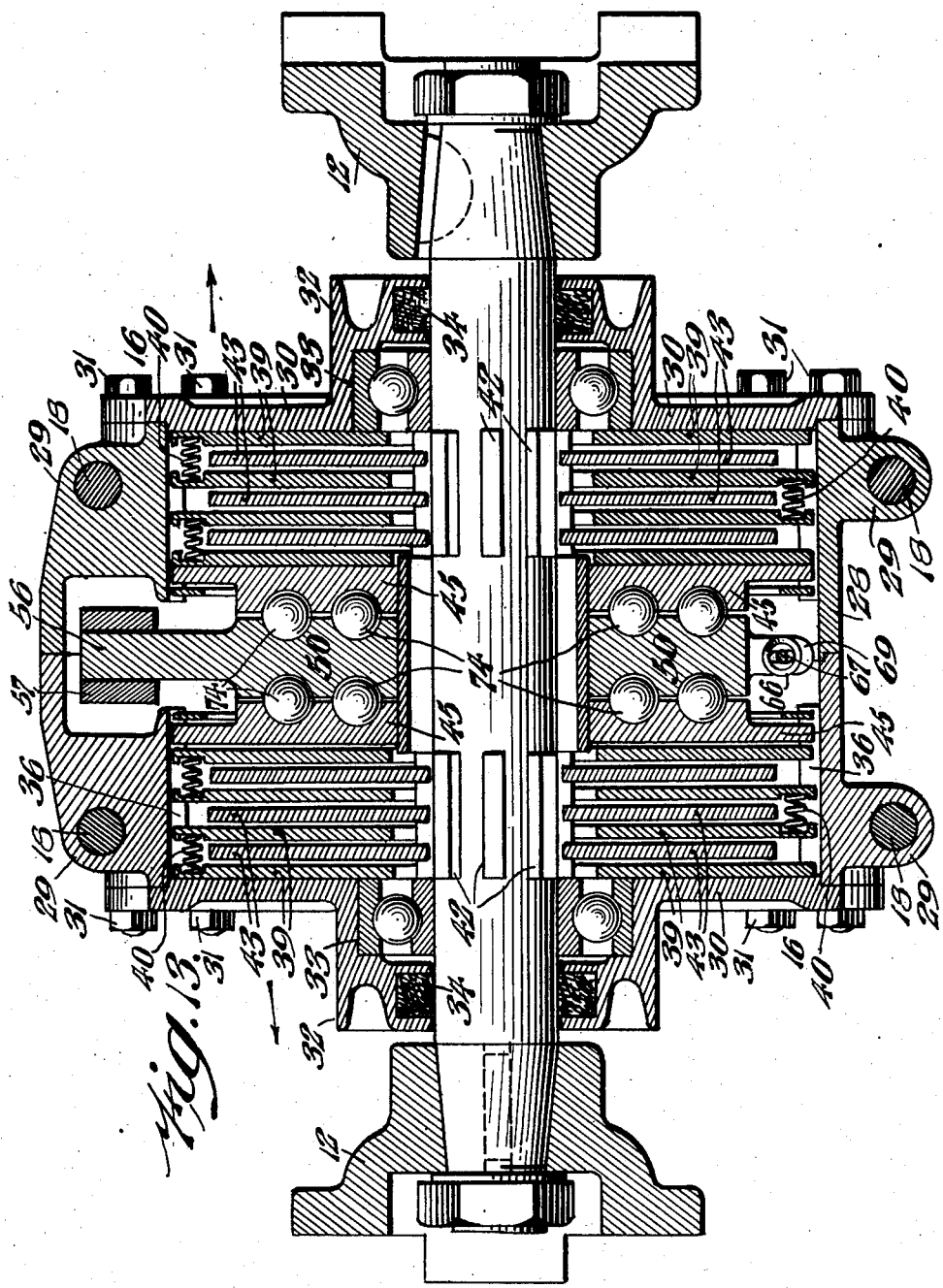
INVENTOR
*Elbert A. Corbin, Jr.,*
BY
ATTORNEY

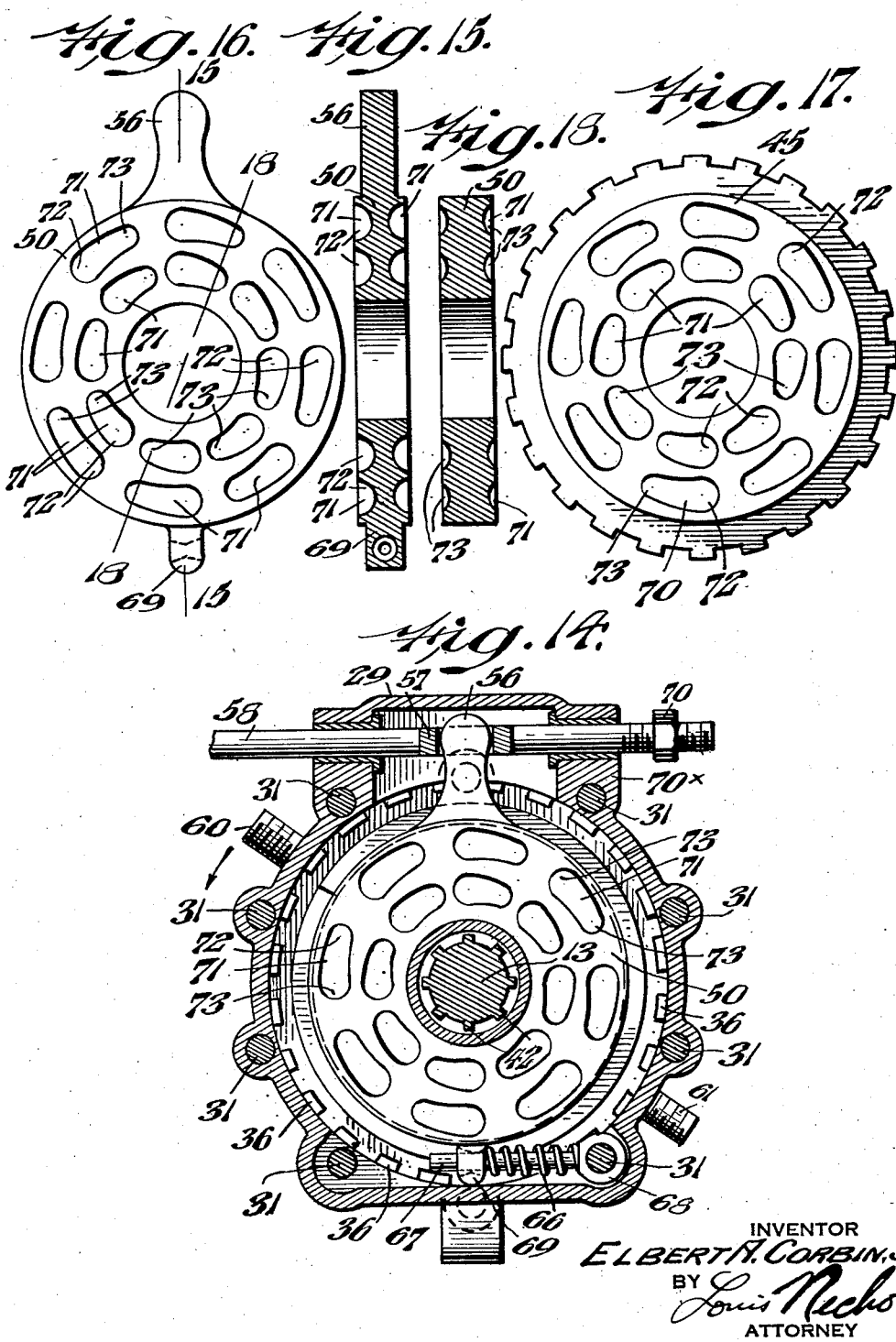

Patented Oct. 8, 1935

2,016,359

UNITED STATES PATENT OFFICE 2,016,359

BRAKE

Elbert A. Corbin, Jr., Gradyville, Pa., assignor of one-half to William C. Biddle, Lansdowne, Pa.

Application April 6, 1933, Serial No. 664,684

7 Claims. (Cl. 188—72)

My invention relates to a new and useful brake and it relates more particularly to a brake applied to the axle which supports or drives the wheels of a vehicle as opposed to conventional brakes applied to or carried by the wheels of a vehicle themselves.

My invention further relates to a brake of the general character disclosed and claimed in my previous Patent No. 1,859,280 and my co-pending application for patent, Serial No. 575,748, filed November 18, 1931, my present construction being an improvement upon and an adaptation of the construction disclosed and claimed in said patent and application for patent, to the axle of a vehicle as opposed to the application of the previously disclosed and claimed form of mechanism to the wheels of the vehicle.

Brake mechanisms carried by or applied to the brake drums, or similar structures, in proximity to or in close association with the wheels proper are constantly subjected to the extreme exigencies to which the wheel itself is always exposed, particularly in the field of automotive vehicles where the wheels are constantly subjected to impact against curbs, obstructions, ruts, or other irregularities in the road-bed, so that a brake mechanism carried by a wheel is often bent out of true or is otherwise damaged. Furthermore a brake mechanism carried by the wheel, even if enclosed in the conventional manner, is nevertheless exposed to moisture which materially affects the adjustment or efficiency of the braking mechanism or to the entry of grit between the coacting parts which unduly increases the wear and tear on the gripping surfaces of the brake mechanism. A brake mechanism of the structure herein involved must be completely encased so as to keep out extraneous atmospheric and other influences, and due to its short operating range and its relatively narrow margin of tolerance it must be maintained in constant, true alignment and must be protected against any impacts and shocks.

It is further desirable that the brake unit be made separately and independently from any part of the vehicle to which it is attached so that the same may be removed for repair or replacement expeditiously, with great ease and with minimum labor and skill.

It is therefore the object of my invention to produce a novel brake mechanism which may be readily applied to the axles of driving or driven wheels of a vehicle where such braking mechanism unit is safe from all danger of impact so as to insure constant, perfect alignment.

A further object of my invention is to produce a novel braking unit which can be applied to the axles of the wheels of a vehicle with minimum interference with the conventional standard construction of such vehicle.

A further object of my invention is to produce a braking unit of the general character described, which is completely encased and which is provided with suitable cooling means, thereby insuring against undesirable atmospheric effects, as well as against overheating and subsequent wear or jamming of the parts.

A further object of my invention is to produce a braking mechanism which constitutes a separate unit, complete in itself, and which can be removed and installed as a unit, without the necessity of removing any other standard parts of the vehicle construction.

A still further object of my invention is to produce a novel braking mechanism which can be manufactured in standard units which can be applied interchangeably to the driving as well as the driven wheels of a vehicle.

A still further object of my invention is to produce a braking mechanism which is readily adjustable from without, and which, while possessing extreme braking power and efficiency, is nevertheless very compact and is operable with a minimum of exertion and with a minimum operating stroke or range.

My invention still further relates to various other novel features and advantages, all as hereinafter described and claimed in connection with the accompanying drawings in which:

Fig. 2 represents, on a reduced scale, a view partly in section and partly in elevation taken along the line 2—2 of Fig. 1.

Fig. 3 is a view similar to Fig. 2, taken on line 3—3 of Fig. 1.

Fig. 4 is a view similar to Fig. 3, taken on line 4—4 of Fig. 1.

Fig. 10 represents a diagrammatic view illustrating the application of the braking unit to the axles of the driving wheels of a vehicle, one unit being exposed to view and the other being shown completely enclosed.

Fig. 11 is a view similar to Fig. 10 illustrating in a diagrammatic manner the application of the brake units to the axles of the driven wheels of a vehicle.

Fig. 12 represents diagrammatically the application of a cooling system for cooling the brake units.

Figs. 13, 14, 15, 16 and 17 are views similar to Figs. 1, 2, 5, 6 and 7, respectively, showing a modified form of construction.

Fig. 18 is a section on line 18—18 of Fig. 16.

Figure 1:
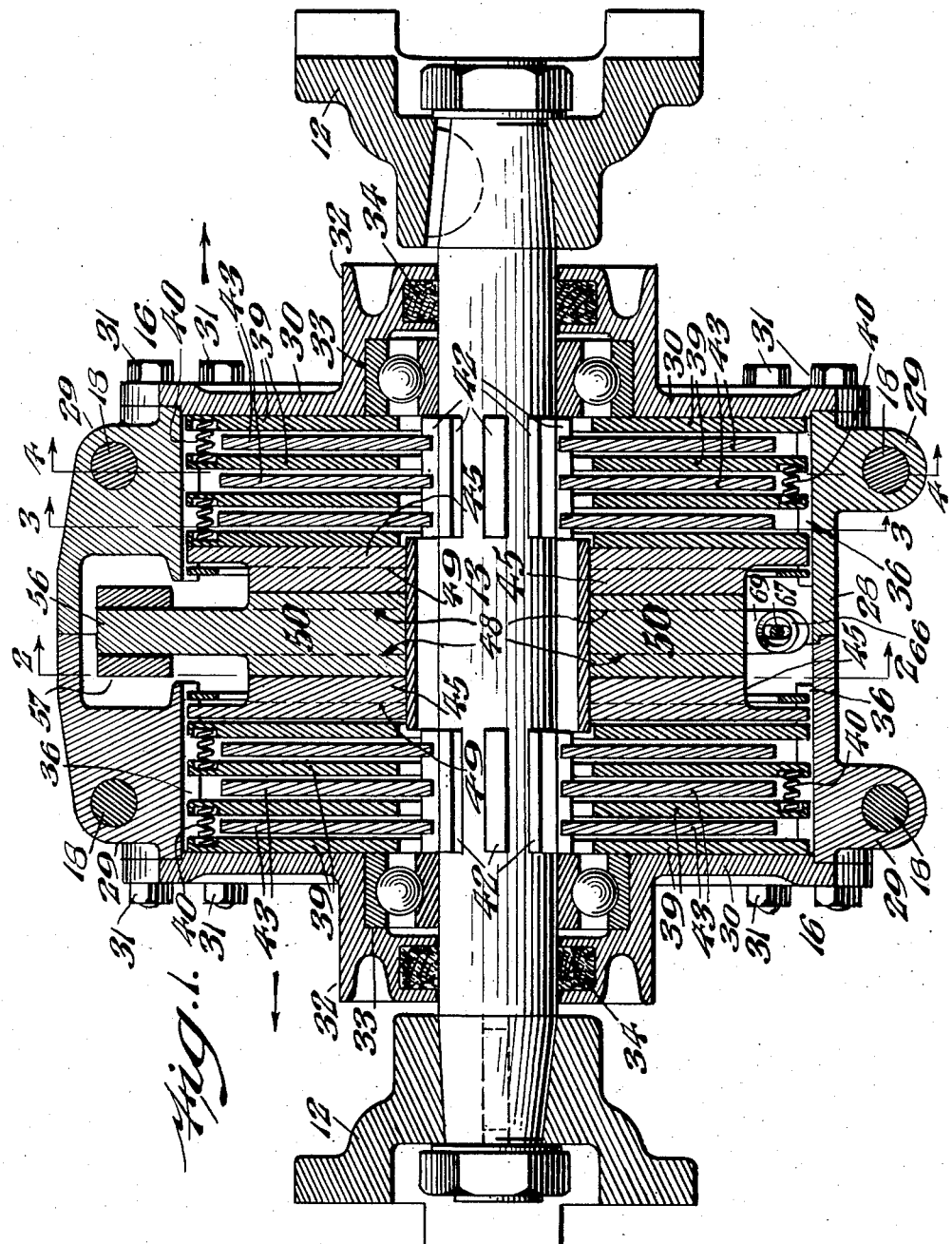
Fig. 1 is a vertical sectional view, on a greatly enlarged scale, of a brake unit ready for application to the axle of a driven or free wheel of a vehicle.
Figures 5, 6:
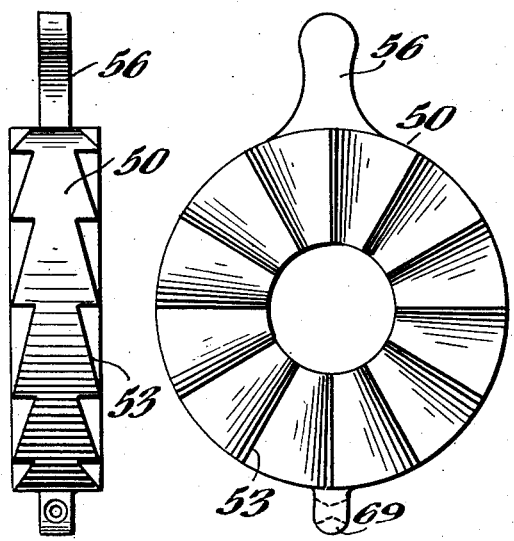
Fig. 5 is an end elevation of the movable operating cam disc, seen in Fig. 2.
Fig. 6 is a side elevation of either face of the operating disc shown in Fig. 5.

Referring first to Fig. 10, 1 designates the wheels of a vehicle, 2 the rear axle housings, and 3 the rear end housing which contains the ring, gear, pinion and differential mechanism, all of which are of the conventional construction and are designated generally as A. In order to accommodate the brake units, the rear end housing 3 is provided with extensions 4 which may be of the desired size and contour and which are provided with at least one removable plate 5 which when removed, as shown at the right hand side of Fig. 10, exposes the brake unit completely, and which when applied, as shown on the left hand side of Fig. 10, completely encloses or encases the brake unit. The driving axles which actuate the wheels 1 and which in turn are revolved by the driving mechanism, generally indicated as A, are formed of two sections, one section 8 connected to the wheel and the other section 9 connected to the driving mechanism A. My novel brake unit is interposed between the juxtaposed ends of the sections of the axles 8 and 9, as shown in Fig. 10, the juxtaposed ends of said axle sections being provided with the couplings 11 which are adapted to receive and engage the couplings 12 at the opposite ends of the intermediate axle section 13 which carries the brake unit 15 and which serves to operatively join or connect the axle sections 8 and 9 to transmit the driving action of the driving mechanism A to the wheels 1. The brake unit 15 is enclosed in a suitable casing 16 and is rigidly secured to the extension 4 of the rear end housing 3 by the bolts 18.

Referring next to Fig. 11, it will be seen that the brake unit 15 is applied to a pair of front wheels 20 by the provision of an auxiliary casing 21 secured to the axle 22, and to a suitable hub or bearing in the wheels 20, to which casing is secured the brake unit by means of the bolts 18 in the manner explained in connection with Fig. 10.

It will be noted by reference to the right hand section of Fig. 11, in which the closure plate 5 is removed, that the brake unit there employed is identical with that shown in Fig. 10. Thus, in Fig. 11, one of the couplings 12 of the brake unit 15 engages the corresponding coupling 24 on the axle 25 on which the wheel 20 revolves, the other coupling 12 of the brake unit 15 being free and unengaged.

It will be seen from the foregoing that I have provided novel and simple means for applying a brake unit interchangably and with minimum effort to the axles of driven and free, non-driven wheels of any vehicle, automotive or otherwise, that such brake unit is normally completely enclosed, and that such unit can be readily exposed and removed for replacement or repair by the mere removal of a plate 5 which forms part of the casing enclosing the unit, said casing being carried by the axle of a non-driven wheel or by the axle housing of a driven wheel as the case may be.

Reverting now to Fig. 1, in which the construction of the brake unit 15 is shown, it will be seen that the braking mechanism is contained in the inner casing 16 comprising the annular or cylindrical member 28, which has the lugs or flanges 29 through which pass the bolts 18 (to fasten the inner casing 16 to the axle housing 4 or outer casing 21, as the case may be,) and the covers 30 which form vertical side walls for the inner casing 16 and which are secured by means of the bolts 31. The covers 30 forming the side walls are provided with hubs 32 which are provided with suitable anti-friction bearings 33 and stuffing boxes or gaskets 34 through which the axle extension 13 extends, and in which the said axle extension 13 is permitted to revolve freely. The cylindrical member 28 is provided with the elongated splines 36 in which are keyed the stator friction discs 39 which are movable longitudinally of the cylindrical member 28 along the splines 36. The stator friction discs 39 are provided with plain surfaces on both sides, and the intermediate pairs of said stator discs are preferably provided with springs 40 which serve normally to retain said stator discs spaced from each other in a manner and for a purpose hereinafter more fully set forth. On the axle section 13 are provided the splines 42, to which are keyed the rotor plates 43 so that the rotor plates revolve with the axle 13 and are movable longitudinally of said axle along the splines 42. The stator discs 39 and the rotor discs 43 are normally slightly spaced from each other so that the rotor discs 43 may revolve freely between the stator discs 39 without coming in contact with the latter unless the brake is applied in the manner hereinafter set forth. Keyed to the splines 36 on the cylindrical member 28 are the operating discs 45, the outer surfaces of which, that is the surfaces which are juxtaposed to and adapted to abut against the adjacent stator plates 39, are smooth or plain. The other surfaces of the operating discs 45 are provided with radial cams 47, the high points of which coincide with the line 48 and the low points of which coincide with the line 49 in Fig. 1. Intermediate the non-rotatable operating discs 45 is positioned the rotatable operating disc 50 which is provided with radial cams 53 on the opposite faces thereof, the high points of said cams coinciding with the line 49 and the low points of said cams coinciding with the line 48 in Fig. 1. The rotatable operating disc 50 is provided with the lug 56 which is engaged by the yoke 57 on the actuating rod 58 which is connected by suitable intermediate levers to the brake pedal in front of the driver's seat. The operating disc 50 is provided with a bottom return or release spring 66 which is coiled or wound upon the guide pin or rod 67 anchored at one end thereof to one of the bolts 18 by means of a collar or head 68, the free end of the pin 67 passing through a lug 69 at the bottom of the rotatable operating disc 50. The spring 66 thus serves to return the disc 50 to the position shown in Fig. 2 after pressure on the brake pedal (not shown) has been relieved, it being understood that the depression of the brake pedal to apply the brakes swerves or rotates the operating disc 50 in the direction of the arrow in Fig. 2.

In order to provide for ready adjustment, the actuating rod 58 is equipped with a nut 70 which threadedly engages the free end of the rod 58, the spacing of the nut 70 from the vertical edge 71 of the lug or supporting member serving to determine the range or stroke of the actuating rod 58 and also serving to indicate to the mechanic from without the extent of wear and tear on the coacting friction plates forming part of the brake unit. Thus, when the friction plates are new and when the cams on the stationary and rotating operating plates are also new, a very slight depression of the brake pedal and movement of the actuating rod 58 will suffice to produce the braking effect desired. As the various plates and cams mentioned wear out, it will be necessary further to depress the brake pedal and further to pull the actuating rod 58 further to compress the various friction plates to produce the desired braking effect. Therefore, with a new unit the nut 70 is adjusted to a position very near the vertical edge 71 of the casing so as to subject the friction plates to only as much force as is necessary to produce the braking effect, and further force applied by the operator on the brake pedal being absorbed by abutment of the nut 70 against the face 71. As the plates wear down the nut 70 is gradually further spaced from the vertical face 71 against which it abuts when the brake is applied, thereby increasing the range of movement of the actuating rod 58 and hence also increasing the range of movement and consequent compression of the friction plates and operating cam plates. When the nut 70 has reached to the limit of its outward adjustment, that is when it is almost at the right hand end of the actuating rod 58, the mechanic inspecting the brakes will know that the braking unit 15 is worn out completely and that it must be changed. The operation is as follows:

When the brake pedal (not shown) is depressed, tension is applied to the rod 58 so as to revolve the operating disc 50 with respect to the adjacent non-rotatable but longitudinally movable operating disc 45 so as to move the high points of the cams 53 on the disc 50 towards the high points of the cams 47 on the discs 45. This results in gradually pushing the operating discs 45 in the direction of the arrows in Fig. 1, that is, longitudinally of the axle 13 so as to compress the stator friction discs 39 and the rotor friction discs 43 together, against the tension of the springs 40. The frictional binding of the stator discs 39 against the rotor discs 43 serves to stop the rotation of said rotor discs and hence the rotation of the axle section 13 on which the rotor discs 43 are longitudinally keyed. Since the binding together of the stator discs 39 and the rotor discs 43 tends to produce a great degree of heat and since the unlubricated contact of said rotor and stator discs together produces an extreme degree of frictional binding which would result in producing very sudden stops, I find it is desirable to provide means for cooling the stator and rotor discs, and, if so desired, for very slightly or partially lubricating the coacting surfaces of the rotor and stator plates slightly to ameliorate or mitigate the frictional binding of said rotor and stator discs to produce a gradual but nonetheless highly effective stopping action when said rotor and stator discs are brought into frictional engagement by the depression of the foot brake pedal in the usual manner. To this end, I have provided each brake unit casing with an upper inlet 60 and a lower outlet 61 for receiving and discharging respectively any desired cooling fluid which may or may not possess lubricating qualities of the desired extent, if such lubrication should be deemed necessary or desirable. In order constantly to cool the cooling and lubricating fluid used, I provide a pump 63 which forces the liquid into the radiator 62, from which the liquid flows through the pipe 65 into the upper inlets 60 through the branch pipes 64. The fluid flowing out of the bottom outlets 61 passes into the common pipe 66 and is sucked by the pump 63 and forced into the radiator 62 to be cooled again. The radiator 62 may be positioned immediately behind the conventional engine radiator 67. By means of this circulating mechanism, the cooling fluid is constantly pumped from the radiator 62, where it is cooled, into the upper portions of the brake unit 15 completely to flush the coacting stator and rotor discs 39 and 43, as well as the operating discs 45 and 50, the object being to prevent overheating of the parts mentioned and to provide a cushioning effect to prevent extreme, sudden stops and jerks. It will be understood that the liquid used is one which will not readily freeze or evaporate, so as to render efficient service under the conditions of heat and cold met in actual operation at any place or at any time.

Figure 7:
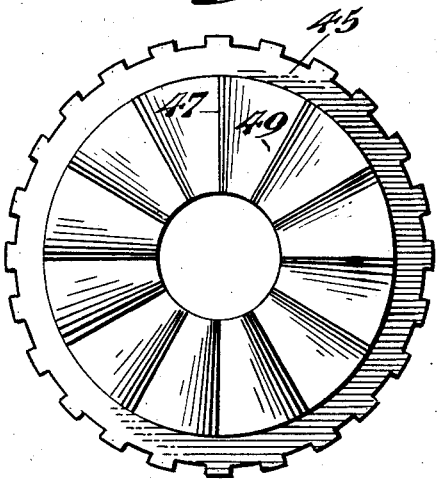
Fig. 7 represents a side elevation of one of the stationary operating discs which coact with the cam faces of the movable operating disc shown in Figs. 5 and 6.
Figure 8:
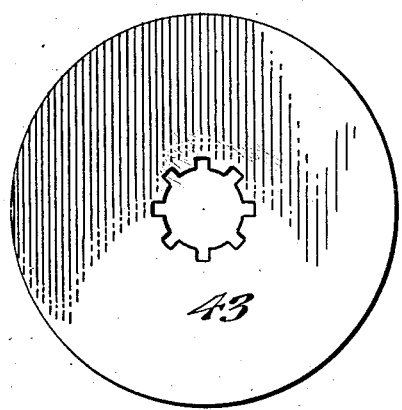
Fig. 8 is a side elevation of one of the rotor friction plates or discs carried by the axle and revolvable therewith and which coact to produce a braking effect with the stator friction braking plates or discs which are carried by the housing.
Figure 9:
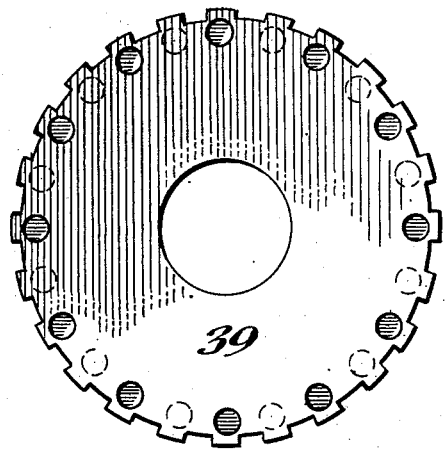
Fig 9 is a side elevation of the stator friction braking disc referred to in connection with Fig. 8.

In Figs. 13 to 18, I have illustrated a modified form of my invention in which the non-rotatable operating plates 45, instead of being provided with the radial cams 47, as in Fig. 7, are provided with the oblong recesses 70 in one face thereof while the rotatable actuating plate or disc 50 is provided with corresponding oblong recesses 71 on both faces thereof, as shown in Fig. 15 so that the oblong recesses 71 on the opposite faces of the rotatable operating plate 50 will register with the corresponding recesses 70 on the juxtaposed contiguous faces of the non-rotatable operating plates 45. The oblong recesses 70, as well as the recesses 71, are preferably of a gradually decreasing depth so that they are deeper at their wider ends 72 than they are at their narrower ends 73, as shown in Figs. 15 and 18. In the corresponding recesses 70 and 71 on the operating plates 45 and 50 are seated the ball 74 which when the actuating plates 45 and 50 are in their neutral noneffective position, as shown in Fig. 13, will be seated in the wider, deeper end portions 72 of the corresponding registering recesses 70 and 71 so that the opposite faces of the rotatable actuating disc 50 will be contiguous or flush with the juxtaposed faces of the non-rotatable actuating plates 45 on either side thereof. When the rotatable actuating plate 50 is revolved by means of the actuating rod 58 in the manner hereinabove described in connection with Fig. 1, the balls 74 are forced out of the deep, wide ends 72 of the recesses 70 and 71 where such balls are completely accomodated in the shallower and narrower ends 73 of the recesses 70 and 71 so that the balls 74 will tend to space the actuating plates 45 away from the rotatable actuating plate 50 in the direction of the arrows in Fig. 13, thereby binding or compressing the rotor discs 43 against the stator discs 39, all in the manner hereinabove set forth in connection with the description of Figs. 1 to 12. Therefore, except for substituting the balls 74 and the accommodating oblong recesses 70 on the operating plates 45 and 50 for the radial cams 47 and 53 on the plates 45 and 50, respectively, the construction disclosed in Figs. 13 to 18 is identical in structure and operation with the construction described in connection with Figs 1 to 12.

While in the drawings and the foregoing description, I have illustrated and described my invention as applied to the rear and front axles of an automobile, it is to be understood that my invention is not limited in its conception or its application to the automobile construction illustrated and that my invention is equally applicable without any material changes in the construction to any revolving wheel, whether the same forms part of a vehicle or whether it forms part of other machinery.

Having thus described my invention, what I claim as new and desire to secure by Letters Patent is:

1. An axle section, a brake unit mounted on said axle section, identical couplings on either end of said axle section for operatively and detachably connecting said axle section to the corresponding ends of an assembled revoluble axle to which the unit is to be applied, whereby said brake unit may be detachably and interchangeably applied to said revoluble axle without dismantling said assembled axle, means for actuating said brake unit, and means for externally indicating the condition of wear of the parts of said unit.

2. The combination with a revoluble axle of a casing rigidly secured in proximity to said axle, a plurality of longitudinally movable, non-rotatable plates carried by said casing, a plurality of intermediate longitudinally movable plates carried by said axle and revoluble therewith, an actuating mechanism for compressing said plates together to stop the rotation of said axle comprising a plurality of operating plates having normally nesting, alternating, complementary cam projections on the working surfaces thereof, means for limiting the movement of said actuating mechanism, and means for actuating said operating plates to bring the cam projections on the working surfaces thereof out of their nesting inoperative position into their registering operative position.

3. The combination with a revoluble axle of a casing rigidly secured in proximity to said axle, a plurality of longitudinally movable, non-rotatable plates carried by said casing, a plurality of intermediate longitudinally movable plates carried by said axle and revoluble therewith, an actuating mechanism for compressing said plates together to stop the rotation of said axle comprising a plurality of operating plates having normally nesting, alternating, complementary cam projections on the working surfaces thereof, means for limiting the movement of said actuating mechanism and for indicating the extent of wear of said plates, and means for actuating said operating plates to bring the cam projections on the working surfaces thereof out of their nesting inoperative position into their registering operative position.

4. An axle section, a completely assembled, totally enclosed brake unit mounted on said axle section and identical couplings on either end of said axle section operatively to connect said axle section to the corresponding ends of an assembled revoluble axle, whereby said brake unit may be detachably and interchangeably applied to said revoluble axle, without dismantling said assembled axle.

5. In a device of the character stated, a plurality of longitudinally movable, non-rotatable plates, a plurality of intermediate longitudinally movable, rotatable plates, longitudinally movable, non-rotatable operating discs associated with said plates and having registering recesses in the juxtaposed faces thereof, a longitudinally movable, rotatable actuating plate intermediate said operating plates and having recesses in the opposite faces thereof complementary to and registering with the recesses in the contiguous faces of said operating plates, and movable cams adapted to seat within the complemental recesses in contiguous faces of said operating plates and said actuating plate.

6. In a device of the character stated, a plurality of longitudinally movable, non-rotatable plates, a plurality of intermediate longitudinally movable, rotatable plates, longitudinally movable, non-rotatable operating discs associated with said plates and having registering recesses in the juxtaposed faces thereof, a longitudinally movable, rotatable actuating plate intermediate said operating plates and having recesses in the opposite faces thereof complementary to and registering with the recesses in the contiguous faces of said operating plates, and movable cams adapted to seat within the complemental recesses in contiguous faces of said operating plates and said actuating plate, said complemental recesses being elongated and each having a relatively deep portion gradually merging into a relatively shallow portion.

7. The combination with an automotive vehicle, having a rear power transmission and rear wheels, of axle sections engaging said transmission at the inner ends and having identical couplings at their outer ends, a pair of axle sections engaging the rear wheels of said vehicle at their outer ends and having couplings at their inner ends identical with the couplings at the outer ends of said first mentioned axle sections, a pair of interconnecting axle sections, each having couplings at both ends thereof identical with the couplings on said first and second mentioned axle sections and adapted interchangeably, detachably and operatively to interconnect said first and second mentioned axle sections, and a brake unit carried by said last mentioned axle sections.

ELBERT A. CORBIN, Jr.